June 17, 1969  J. H. MERCIER  3,450,162
PRESSURE VESSEL WITH CONTROL DEVICE
Filed May 3, 1966
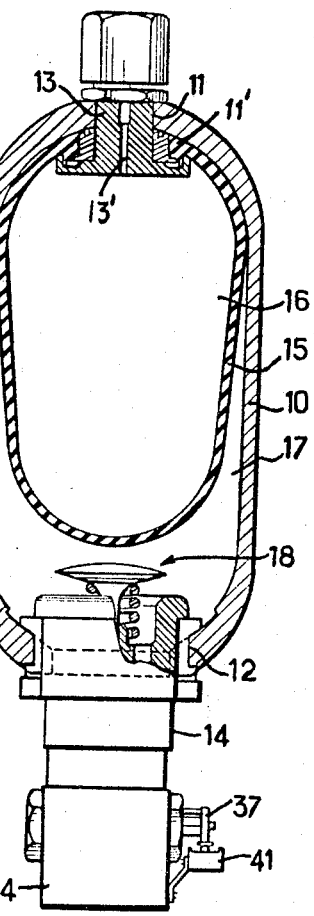
FIG. 1
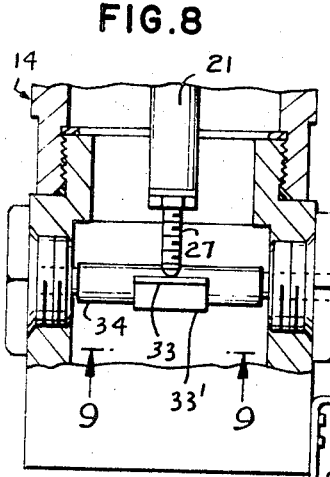
FIG. 8
FIG. 9
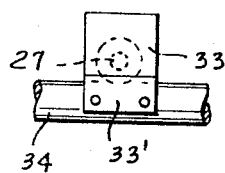
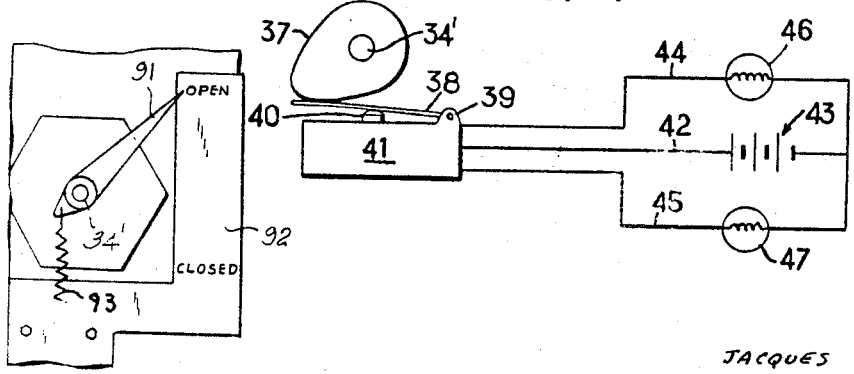
FIG. 4
FIG. 10
INVENTOR
JACQUES H. MERCIER
BY
ATTORNEY INVENTOR
JACQUES H. MERCIER
BY Arth B Colvin
ATTORNEY

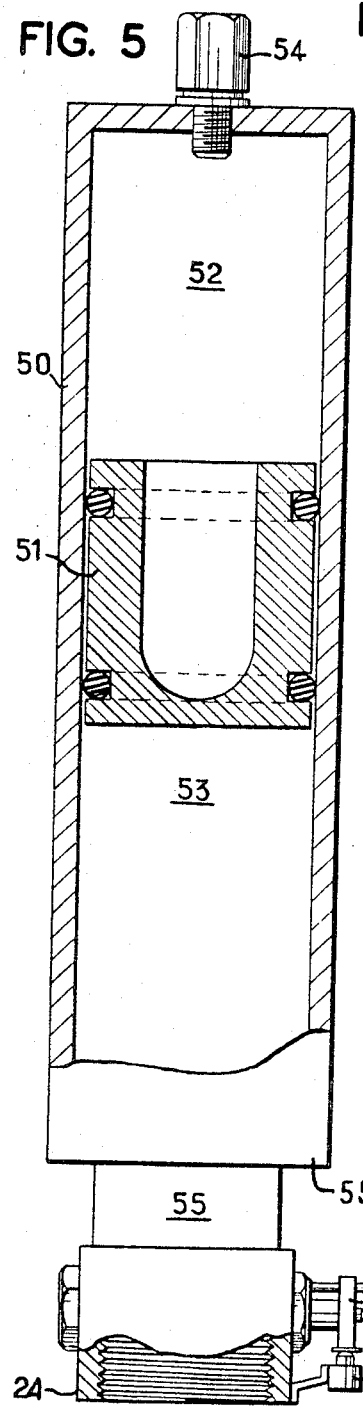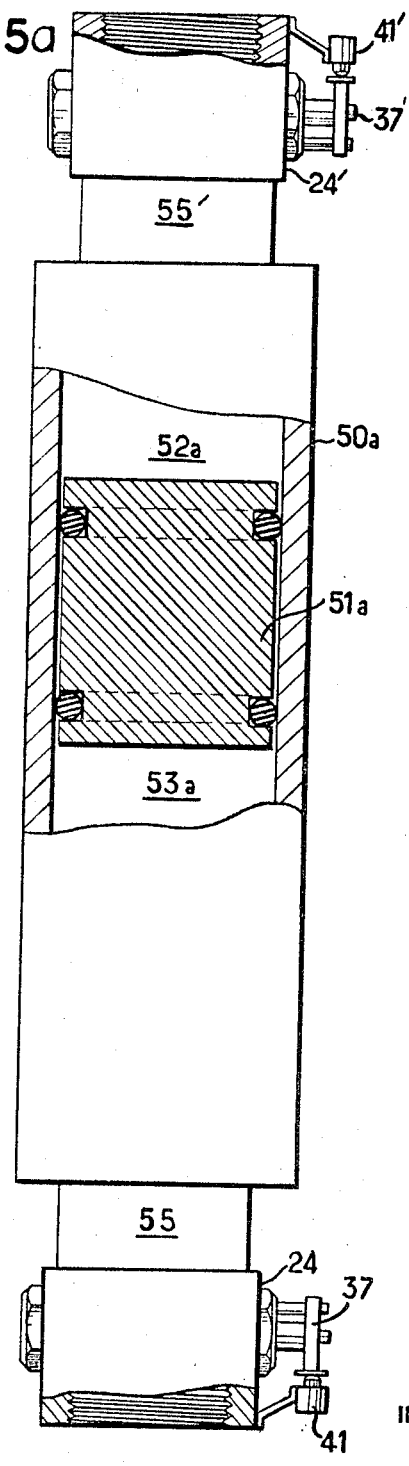

United States Patent Office 3,450,162
Patented June 17, 1969

3,450,162
PRESSURE VESSEL WITH CONTROL DEVICE
Jacques H. Mercier, New York, N.Y., assignor to Olaer Patent Company, Walram, Luxembourg, a corporation of Luxembourg
Filed May 3, 1966, Ser. No. 547,204
Claims priority, application France, May 11, 1965, 16,534
Int. Cl. F16l 55/04, 55/02
U.S. Cl. 138—30                    9 Claims This invention relates to the art of pressure vessels of the type having a movable separator defining two chambers each to be charged with a fluid under pressure and more particularly to a control device associated with a port in communication with one of said chambers.

As conducive to an understanding of the invention, it is noted that when the separator is moved to one of its extreme positions in the pressure vessel and at such time substantially all of the fluid in the chamber associated with the outlet port of the pressure vessel has been expelled therefrom, in many applications the pressure vessel is no longer capable of performing useful work. It is desirable, if not essential, in such applications that this be indicated so that either a warning can be given or the pressure vessel recharged.

It is accordingly among the objects of the invention to provide a pressure vessel of the above type which incorporates control means that will provide a signal when the separator has moved to a position such that substantially all of the fluid has been discharged from the pressure vessel.

Another object of the invention is to provide a pressure vessel of the above type which has associted control means sensitive to the rate of flow of the fluid from the outlet port thereof.

According to the invention these objects are accomplished by the arrangement and combination of elements hereinafter described and more particularly recited in the claims.

In the accompanying drawings in which are shown one or more of various possible embodiments of the several features of the invention, FIG. 1 is a longitudinal view partly in cross section of a pressure vessel of the bladder type according to the invention;

FIG. 4 is a diagrammatic schematic view showing an electrical circuit associated with the control mechanism of FIGS. 1 to 3;

FIG. 5 is a longitudinal sectional view of a pressure vessel of the piston type according to one embodiment of the invention in which the control mechanism is associated with the liquid outlet port of the pressure vessel;

FIG. 5a is a view similar to FIG. 5 in which control mechanisms are associated with the ports of the pressure vessel in communication with the two chambers therein defined by the piston;

FIG. 6 is a longitudinal sectional view of the control mechanism of the embodiments of FIGS. 5 and 5a;

FIG. 7 is a diagrammatic schematic view of a hydraulic electrical circuit for recharging the pressure vessel of FIGS. 5 and 5a;

FIG. 8 is a fragmentary detail view of another embodiment of the invention;

FIG. 9 is a detail sectional view taken along line 9—9 of FIG. 8, and

FIG. 10 is a detail side view taken along line 10—10 of FIG. 8.

Figure 2:
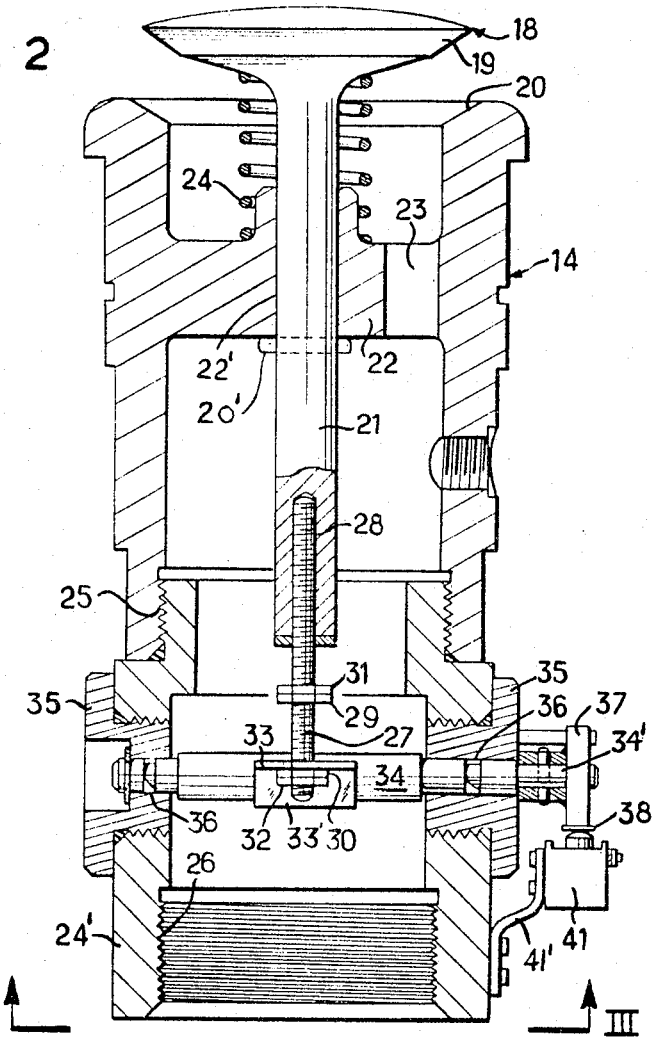
FIG. 2 is a longitudinal sectional view on a greatly enlarged scale of the control mechanism of the embodiment of FIG. 1.

Referring now to the drawings, as shown in FIG. 1, the pressure vessel which may be a pressure accumulator, comprises a shell or container 10 of rigid material, preferably cylindro-spherical as shown and having axially aligned ports 11 and 12 at each end.

Positioned in the container 10 is a bladder 15 which illustratively is substantially conical along its length and is desirably of resilient material such as rubber or synthetic plastic of like physical characteristics and is capable of readily collapsing and expanding in use. The mouth 11' of the bladder is retained in fixed position in the port 11 by any suitable means such as a fitting 13 which has an axial bore 13' therethough providing communication for example for a fluid such as gas under pressure into the chamber 16 defined by the bladder.

Positioned in the port 12 and extending outwardly therefrom is a cylindrical sleeve 14 which is secured in said port 12 in any suitable manner. The inner end of sleeve 14 has a bevelled surface defining an annular valve seat 20. Extending transversely across the bore of the sleeve 14 is a wall 22 which has a plurality of passageways 23 therethrough through which the fluid contained in chamber 17 of the pressure vessel may pass. The wall 22, as shown in FIG. 2, has an axial bore 22' through which slidably extends the valve stem 21 of a valve assembly 18, the inner end of said stem 21 mounting a valve head 19 adapted to be moved against seat 20 to close the latter. The valve head 19 is normally urged to open position as shown in FIG. 2 by means of a coil spring 24 encompassing the valve stem 21 and compressed between wall 22 and the valve head 19. A pin 20' extending through the stem 21 limits the open position of the valve head.

The outer end of the sleeve 14 is internally threaded as at 25 to receive a housing 24' which mounts the control mechanism.

As shown in FIG. 2, the control mechanism comprises a pin 34 which extends transversely across the housing 24' and is rotatably mounted in opposed bearing plugs 35 screwed into opposed walls of the housing 24'. Each of the ends of the pin 34 has an annular groove in which a resilient seal ring 36 is positioned. The end 34' of pin 34 which is of reduced diameter extends beyond the associated bearing plug 35 and has secured thereto a cam 37. The cam 37 is designed to actuate a lever 38 which is pivoted as at 39 to the body of micro-switch 41 to effect movement of the plunger 40 of said microswitch.

The micro-switch 41 is rigidly mounted by means of a bracket arm 41' to the housing 24' as shown in FIG. 2. Secured to the pin 34 and centrally located with respect thereto is a bracket 33' which mounts an arm 33 that normally extends transversely with respect to the housing 24' at right angles to the longitudinal axis thereof.

Figure 3:
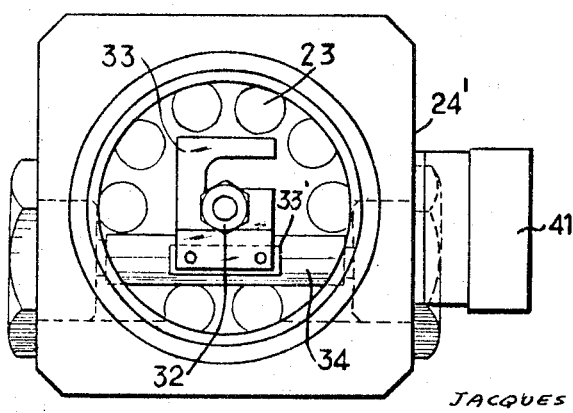
FIG. 3 is an end view taken along line III—III of FIG. 2.

As shown in FIG. 3, the pin 34 is displaced from the longitudinal axis of the housing 24' and the arm 33 has an opening therethrough through which extends a threaded rod 27. The rod is screwed into a threaded axial bore in valve stem 21 as at 28 and the opposed end of the rod 27 is encompassed by two pairs of adjustment nuts and lock nuts 29, 31 and 30, 32, said pairs of nuts straddling the arm 33.

The outer end of the housing 24' is internally threaded as at 26 to receive a conduit from the hydraulic circuit with which the pressure vessel is associated.

In the embodiment shown in FIG. 4, for example, the micro-switch 41 has a lead 42 to which a source of current 43 is connected and leads 44 and 45 which are connected respectively to indicator bulbs 46 and 47. The indicator bulbs 46 and 47 are also connected to the source of current 43 to complete the circuit.

In the operation of the pressure vessel shown in FIGS. 1 to 3, the chamber 16 defined by the bladder 15 is first charged with gas under pressure through bore 13' so as to inflate the bladder until the latter substantially fills the container and abuts against the valve head 19 to move the latter against its seat 20. Thereupon a source of fluid such as oil under pressure is forced through the housing 24' and such fluid will pass through the passageways 23 and after moving the valve head 19 off its seat, enter the chamber 17 and compress the bladder 15.

Thereupon, a valve (not shown) controlling the housing 24' is closed and the equipment is ready for use. When it is desired to connect the charged pressure vessel into the hydraulic circuit such valve (not shown) is opened. As a result, fluid under pressure will be forced by the expanding bladder 15 through open port 20 and passageways 23, through the housing 24' to the hydraulic circuit to be actuated.

When the bladder 15 has expanded sufficiently so that substantially all of the oil is discharged from chamber 17, the expanded bladder will press against the valve head 19 to move the latter against the seat 20 thereby to prevent extrusion of the bladder.

The movement of the valve head 19 toward its seat is transmitted mechanically by valve stem 21 and threaded rod 27, through arm 33 to the pin 34 to cause rotation of such pin. This mechanical movement will be transmitted when the nut 29 in its downward movement abuts against the arm 33 and by adjustment of the position of such nut the pin 34 can be made to rotate at any desired position of the valve head 19 with respect to seat 20. Due to such rotation of the pin 34 and the corresponding rotation of cam 37, the micro-switch 41 will be actuated to energize the bulb 47, for example, to indicate closure of valve head 19.

It is apparent that by proper adjustment of nut 29 the bulb 47 can be energized prior to closing of valve head 19 to indicate that the chamber 17 of the pressure vessel is substantially empty.

When fluid under pressure is again forced into the housing 24' to recharge the pressure vessel, by reason of the lost motion provided between the spaced nuts 29 and 30, the pin 34 will not be rotated until valve head 19, for example, has reached its position of maximum opening. At this time, due to rotation of the pin, the micro-switch will be actuated to de-energize bulb 47 and energize bulb 46.

By reason of the fact that the pin 34 is subjected to atmospheric pressure on both its exposed ends and to the pressure in the housing 24' on the portion thereof in the housing, the pin will be completely pressure balanced and hence readily rotatable.

By a suitable selection of the lever 38 and the cam 37, the angular movement of the pin can be relatively small for enhanced sensitivity. If desired, instead of utilizing the micro-switch 41 merely to energize indicators it can control a pump to provide automatic recharge of the pressure vessel when desired.

Furthermore, it is to be noted that where the rate of flow of liquid past the valve seat 20 is relatively great, the pressure differential between that in the chamber 17 and that below the valve head 19 may be sufficiently great to cause premature closing of said valve head. The control circuit above described will also provide an indication of such closing.

In the embodiment shown in FIGS. 5 and 5a, the pressure vessel is of the piston type and more particularly, referring to FIGS. 5 and 5a in which corresponding parts have the same reference numerals, the pressure vessel comprises a cylindrical container 50 in which a piston 51 is slidably mounted, defining chambers 52 and 53 on opposed sides thereof respectively.

In the embodiment of FIG. 5 which is illustratively a pressure accumulator, the chamber 52 may be charged with gas under pressure through a port controlled by plug 54. In the embodiment of FIG. 5a in which the pressure vessel is a fluid transfer device, each of the ends of the container 50a are identical and are as shown in FIG. 6 which is also the construction of the end 55" of the pressure vessel of FIG. 5.

Figure 6:
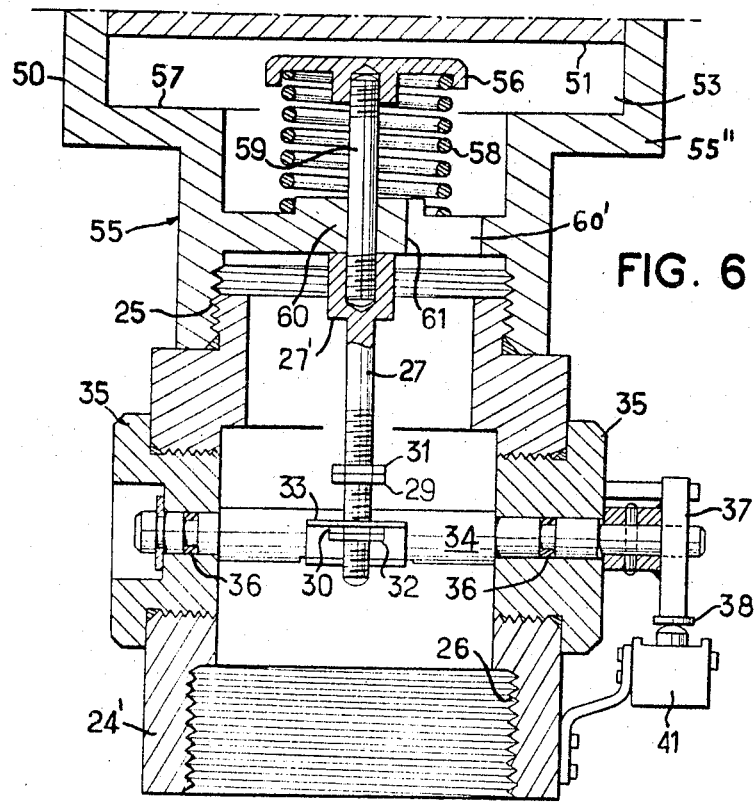

Referring to FIG. 6, it is noted that the end 55" of the pressure vessel 50 has a reduced diameter cylindrical extension 55 with a transverse wall 60 having an axial bore therethrough as well as a plurality of circumferentially spaced passageways 60'. Extending through the axial bore in wall 60 is a rod 59 threaded at both ends. One end of the rod which extends into the chamber 53 of container 50, has secured thereto a pushed head 56, said head being normally urged into the chamber 53 by a coil spring 58 encompassing the stem 59 and compressed between the head 56 and the wall 60. The outer end of member 55 is internally threaded as at 25 to receive the threaded end of a housing 24' identical to that shown in FIG. 2. The control mechanism in the housing is identical to that shown in FIG. 2 and hence will not be described. The threaded rod 27 has an enlarged end 27' with a threaded socket to receive the threaded end of stem 59, said enlarged end abutting against the undersurface of wall 60 to limit the inward movement of the head 56.

Figure 7:
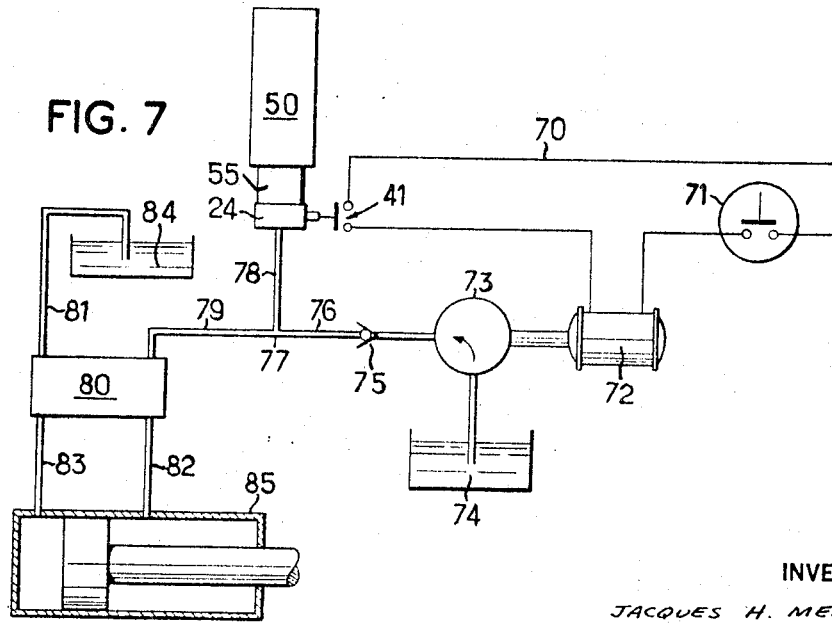

The control means and particularly the micro-switch 41 shown in FIG. 6 may actuate an indicating circuit such as shown in FIG. 4 or a hydraulic circuit as shown in FIG. 7. Thus, for example, referring to FIG. 7, the micro-switch 41 can be arranged in an electrical circuit 70 which, through a main power switch 71, will connect a source of current (not shown) to an electric motor 72 that drives hydraulic pump 73. The pump 73 has an inlet connected to reservoir 74 and an outlet connected through one-way valve 75 and line 76 to junction 77. This junction is connected through line 78 to the threaded inlet 26 of housing 24' and by line 79 to a distributor valve 80. Valve 80 has a discharge line 81 connected to a reservoir 84 and two control lines 82 and 83 which are connected to a hydraulic jack 85 on each side of the piston thereof. Depending upon the position of the valve 80, either of the lines 82 or 83 may be connected to the power source and the other to the reservoir 84.

The control mechanism of the embodiments of FIGS. 5, 5a, 6 and 7 will be actuated when the piston 51 abuts against the control head 56 in the same manner as the operation of the control mechanism of FIGS. 1 to 4 when the expanding bladder abuts against the valve head 19. Thus, for example, when the head 56 is forced downwardly, the micro-switch 41 will complete a circuit to the motor 72 so that the chamber 53 of the pressure accumulator of FIG. 5 can be recharged.

With respect to the embodiment of FIG. 5a, which utilizes a control mechanism at each end of the pressure vessel, either the indicating system of FIG. 4 may be utilized or the control circuit of FIG. 7 may be utilized to charge either of the chambers 52a or 53a of the pressure vessel of FIG. 5a.

It is within the scope of the invention to replace the cam 37 and the associated micro-switch 41 and control circuit by an indicating needle 91 secured to the pin 34 on the protruding end 34' thereof, which needle is associated with a suitable dial 92. In such construction the lower end of the axial stem 21 may react directly against the bracket arm 33 and resilient means 93 are provided to react against the needle 91 at a point displaced from its pivot mount on pin 34 in direction to rotate the pin 34 in a counterclockwise direction, referring to FIG. 10.

With such construction the indicator needle will follow the movement of the valve in both downward and upward direction so that the position of the valve will be dependably indicated.

With the arrangement above described, a relatively simple control mechanism is provided which will afford dependable sensing of the position of the movable separator of the pressure vessel without likelihood of derangement, even with continuous use thereof.

As many changes could be made in the above constructions and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid container for two fluids under pressure, a separator in said container defining two chambers therein, each adapted to be charged with one of said fluids, one of said chambers having a port, said separator being movable to a position adjacent said port, a movable member associated with said port, said movable member comprising a head portion adapted to be engaged by said movable separator, said head portion having an axial stem, control means actuated by said movable member, said control means comprising a rotatable pin extending transversely with respect to said stem, means operatively connecting said stem and said pin to rotate the latter, a cam carried by said pin, and a switch controlled by said cam.

2. A pressure vessel comprising a rigid container for two fluids under pressure, a separator in said container defining two chambers therein, each adapted to be charged with one of said fluids, one of said chambers having a port, said separator being movable to a position adjacent said port, a movable member associated with said port, a housing rigidly connected to said container and having a passageway therethrough in communication with said port, said movable member comprising a head adapted to be engaged by said separator, said head having an axial stem, control means actuated by said movable member, said control means comprising a pin extending at right angles to said stem and rotatably mounted in said housing, spaced abutment means movable with said stem and operatively connected to said pin to rotate the latter, a cam carried by said pin and a switch controlled by said cam.

3. The combination set forth in claim 2 in which said pin is hydraulically balanced.

4. The combination set forth in claim 2 in which said housing has opposed bearings rotatably to mount said pin, said pin having annular sealing members positioned in said bearings to define fluid tight seals.

5. The combination set forth in claim 2 in which an arm is secured at one end to said pin and extends at right angles thereto, said arm having an opening, a rod extending through said opening and being secured at one end to said axial stem, said abutment means comprising a pair of nuts threaded on said rod and straddling said arm.

6. The combination set forth in claim 2 in which one end of said pin extends beyond said housing, said cam is secured to said extending end and said switch is associated with said cam and actuated by the rotation thereof.

7. A pressure vessel comprising a rigid container for two fluids under pressure, a deformable and expandible bladder in said container defining two chambers therein, each adapted to be charged with one of said fluids, one of said chambers having a port defining a valve seat, said bladder being movable to a position adjacent said port, a movable member comprising a valve head associated with said port and adapted to be engaged by said bladder upon expansion thereof for movement against said seat, control means actuated by said movable member and resilient means reacting against said movable member normally to urge the latter away from said seat.

8. A pressure vessel comprising a rigid container for two fluids under pressure, a separator in said container defining two chambers therein, each adapted to be charged with one of said fluids, one of said chambers having a port, said separator being movable to a position adjacent said port, a movable member associated with said port, said movable member comprising a head portion adapted to be engaged by said movable separator, said head portion having an axial stem, control means actuated by said movable member, said control means comprising a rotatable pin extending transversely with respect to said stem, means operatively connecting said stem and said pin to rotate the latter, and an angle indicator hand carried by said pin.

9. A pressure vessel comprising a rigid container for two fluids under pressure, a separator in said container defining two chambers therein, each adapted to be charged with one of said fluids, one of said chambers having a port, said separator being movable to a position adjacent said port, a movable member associated with said port, said movable member comprising a head portion adapted to be engaged by said movable separator, said head portion having an axial stem, control means actuated by said movable member, said control means comprising a rotatable pin extending transversely with respect to said stem, means operatively connecting said stem and said pin to rotate the latter, and a spring loaded angle indicator hand carried by said pin.

References Cited

UNITED STATES PATENTS

| | | | |
|---|---|---|---|
| 2,721,580 | 10/1955 | Greer | 138—30 |
| 2,731,038 | 1/1956 | Purcell | 138—30 |
| 2,779,353 | 1/1957 | Coffey | 138—26 |
| 2,979,070 | 4/1961 | Payne | 138—30 XR |
| 3,109,458 | 11/1963 | Mercier | 138—30 |
| 3,150,684 | 9/1964 | Guinard et al. | 103—25 XR |

LAVERNE D. GEIGER, *Primary Examiner.*

HENRY K. ARTIS, *Assistant Examiner.*